(12) United States Patent
Douglas

(10) Patent No.: US 12,710,190 B2
(45) Date of Patent: Aug. 18, 2026

(54) BUILDING MANAGEMENT SYSTEM WITH INDOOR AIR QUALITY MANAGEMENT USING OUTDOOR AIR QUALITY FORECASTING

(71) Applicant: Tyco Fire & Security GmbH, Neuhausen am Rheinfall (CH)

(72) Inventor: Jonathan D. Douglas, Mequon, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 464 days.

(21) Appl. No.: 18/133,833

(22) Filed: Apr. 12, 2023

(65) Prior Publication Data

US 2023/0332794 A1 Oct. 19, 2023

Related U.S. Application Data

(60) Provisional application No. 63/332,624, filed on Apr. 19, 2022, provisional application No. 63/330,732, filed on Apr. 13, 2022.

(51) Int. Cl.
*F24F 11/63* (2018.01)
*G05B 17/02* (2006.01)
(Continued)

(52) U.S. Cl.
CPC .............. *F24F 11/63* (2018.01); *G05B 17/02* (2013.01); *F24F 2110/52* (2018.01); *F24F 2130/10* (2018.01)

(58) Field of Classification Search
CPC ........ F24F 2110/50; F24F 11/30; F24F 11/62; G08B 5/22; G05B 19/042; G05B 2219/2642; G05B 15/02
See application file for complete search history.

(56) References Cited

U.S. PATENT DOCUMENTS 6,711,470 B1 3/2004 Hartenstein et al.
9,618,224 B2 4/2017 Emmons et al.
(Continued)

FOREIGN PATENT DOCUMENTS

WO WO-2021/011497 A1 1/2021
WO WO-2022/125687 A1 6/2022

OTHER PUBLICATIONS

Sun et al. (Optimal Citzen-Centric Sensor Placement for Air Quality Monitoring: A Vase Study of City of Cambridge, the United Kingson, IEEEAccess, 2019) (Year: 2019).*
(Continued)

*Primary Examiner* — Darrin D Dunn
(74) *Attorney, Agent, or Firm* — Foley & Lardner LLP

(57) ABSTRACT

A building management system can include one or more computer-readable storage media. The one or more computer-readable store can have instructions stored thereon that, when executed by one or more processors, cause the one or more processors to obtain, from a regional air quality data source, a first set of outdoor air quality data, wherein the first set of outdoor air quality data represents air quality measured for a region, obtain, from one or more local sensors coupled to and/or positioned proximate to the building, a second set of outdoor air quality data, wherein the second set of outdoor air quality data represents air quality measurements at one or more positions at or near an exterior of the building, and generate, using the first set of outdoor air quality data and the second set of outdoor air quality data, an air quality assessment for the building.

19 Claims, 7 Drawing Sheets

(51) Int. Cl.
*F24F 110/52* (2018.01)
*F24F 130/10* (2018.01)

(56) References Cited

U.S. PATENT DOCUMENTS 10,724,068 B2 7/2020 Samadpour
10,967,093 B2 4/2021 Mount
11,181,289 B2 11/2021 Federspiel et al.
11,513,486 B2 11/2022 Kupa et al.
11,519,040 B2 12/2022 Molyneux et al.
11,726,439 B1 8/2023 Manautou et al.
11,776,081 B1 * 10/2023 Shao .................... G06V 10/82 705/325
2015/0330817 A1 11/2015 Law et al.
2016/0116181 A1 4/2016 Aultman et al.
2016/0171179 A1 6/2016 Donofrio et al.
2017/0081707 A1 3/2017 Dillon et al.
2017/0130981 A1 5/2017 Willette et al.
2020/0073354 A1 3/2020 Davies et al.
2020/0232992 A1 7/2020 Shioi et al.
2021/0011443 A1 1/2021 Mcnamara et al.
2021/0011444 A1 1/2021 Risbeck et al.
2021/0398230 A1 12/2021 Gupta et al.
2022/0074882 A1 3/2022 Witt et al.
2022/0092418 A1 * 3/2022 Liu ...................... G06N 3/045
2022/0202637 A1 6/2022 Li et al.
2022/0203287 A1 6/2022 Wenger et al.
2022/0203288 A1 6/2022 Wenger et al.
2022/0205962 A1 6/2022 Vanderkoy
2022/0207215 A1 6/2022 Liu et al.
2022/0221184 A1 7/2022 Gupta et al.
2022/0228756 A1 7/2022 Gupta et al.
2022/0254483 A1 8/2022 Boisvert et al.
2022/0277851 A1 9/2022 Wellig
2022/0282886 A1 9/2022 Hriljac et al.
2022/0293261 A1 9/2022 Mcbrady et al.
2022/0305438 A1 9/2022 Wenger et al.
2022/0305881 A1 9/2022 Neu et al.
2022/0315464 A1 10/2022 Axelsson
2022/0412974 A1 12/2022 Tabib-Azar
2023/0001034 A1 1/2023 Baarman et al.
2023/0039967 A1 2/2023 Eldelgawy
2025/0189157 A1 * 6/2025 Goldenson ............ G08B 21/14

OTHER PUBLICATIONS

Sensor networks for routine indoor air quality monitoring in buildings: Impacts of placement, accuracy, and number of sensors (Year: 2018).*
Real Time Localized Air Quality Monitoring and Prediction Through Mobile and Fixed IoT Sensing Network (Year: 2020).*
Real time optimal spatiotemporal sensor placement for monitoring air pollutants (Year: 2020).*
Alvarado et al., "A Methodology to Monitor Airborne PM10 Dust Particles Using a Small Unmanned Aerial Vehicle," Sensors, 2017, vol. 17 (25 pages).
Li et al. "Integrated environment—occupant-pathogen information modeling to assess and communicate room—level outbreak risks of infectious diseases," Building and Environment, 2021, vol. 187 (12 pages).

* cited by examiner 10
100
102
104
106
108
110
112
112
112
114
114
114
116
116
116
120
130

BUILDING MANAGEMENT SYSTEM WITH INDOOR AIR QUALITY MANAGEMENT USING OUTDOOR AIR QUALITY FORECASTING

CROSS-REFERENCE TO RELATED PATENT APPLICATIONS

This application claims the benefit of and priority to U.S. Provisional Patent Application No. 63/330,732 filed Apr. 13, 2022, and claims the benefit of and priority to U.S. Provisional Patent Application No. 63/332,624 filed Apr. 19, 2022, the entireties of both of which are incorporated by reference herein.

SUMMARY

Some implementations of the present disclosure relate to a building management system for monitoring and/or controlling air quality of a building. The building management system can include one or more computer-readable storage media. The one or more computer-readable storage media can store instructions that, when executed by one or more processors, cause the one or more processors to obtain, from a regional air quality data source, a first set of outdoor air quality data, wherein the first set of outdoor air quality data represents air quality measured for a region including the building or proximate to the building. The instructions can also cause the one or more processors to obtain, from one or more local sensors coupled to and/or positioned proximate to the building, a second set of outdoor air quality data, wherein the second set of outdoor air quality data represents air quality measurements at one or more positions at or near an exterior of the building, and generate, using the first set of outdoor air quality data and the second set of outdoor air quality data, an air quality assessment for the building.

In some embodiments, generating the air quality assessment for the building can include executing a model, using at least a portion of the first set of outdoor air quality data and at least a portion of the second set of outdoor air quality data as inputs to the model, to determine, based on a comparison of the at least a portion of the first set of outdoor air quality data and at least a portion of the second set of outdoor air quality, a weight metric correlating the at least a portion of the first set of outdoor air quality data with the at least a portion of the second set of outdoor air quality data, and generate, using the weight metric, a predicted air quality value for the building. The model can be trained using data correlating local air quality data with regional air quality data, and the predicted air quality value for the building can be determined relative to outdoor air quality proximate to the building.

In some embodiments, the instructions can cause the one or more processors to obtain, from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model. The instructions can also cause the one or more processors to obtain, from the one or more local sensors, a third set of outdoor air quality data, wherein the third set of outdoor air quality data corresponds to the given first point in time. The instructions can also cause the one or more processors to determine, using the first future air quality value of the plurality of future air quality values and the third set of outdoor air quality data, a localized air quality value for the building at the given first point in time, and generate, using the second future air quality value of the plurality of future air quality values and the third set of outdoor air quality data, a second localized air quality value for the building for the given second point in time, wherein the second localized air quality value for the building is a predicted value.

In some embodiments, the air quality assessment for the building can include a predicted indoor air quality value for the building for a future point in time, and the instructions can cause the one or more processors to obtain, from the regional air quality data source, a predicted outdoor air quality value for the region including the building or proximate to the building, wherein the predicted outdoor air quality value for the region is generated by a regional model and the predicted outdoor air quality value for the region pertains to the future point in time. The instructions can also cause the one or more processors to obtain, from the one or more local sensors, a third set of outdoor air quality data, wherein the third set of outdoor air quality data pertains to outdoor air quality data prior to the future point in time. The instructions can also cause the one or more processors to update, using at least a portion of the third set of outdoor air quality data and the predicted outdoor air quality value for the region, the predicted indoor air quality value for the building for the future point in time, and determine, using a fourth set of outdoor air quality data, an actual air quality value for the building at the future point in time, wherein the actual air quality value for the building at the future point in time is used to update the regional model that generated the predicted outdoor air quality value for the region.

In some embodiments, the air quality assessment for the building can include an air quality value for the building, and the instructions can cause the one or more processors to generate, using the air quality value for the building, a plurality of recommendations, the plurality of recommendations including a plurality of control actions to improve the air quality value for the building. The instructions can also cause the one or more processors to provide, to a user device, the plurality of recommendations. The instructions can also cause the one or more processors to receive, from the user device, a selection of a first recommendation of the plurality of recommendations, and implement, responsive to receiving the selection of the first recommendation of the plurality of recommendations, control actions included in the first recommendation of the plurality of recommendations.

In some embodiments, the air quality assessment can comprise a prediction of at least one of outdoor air quality or indoor air quality for the building at one or more future times, and the first set of outdoor air quality data can comprise data based on measurements from a measurement station of a weather service.

In some embodiments, the air quality assessment can comprise an uncertainty assessment indicating a level of accuracy of the first set of outdoor air quality data or the second set of outdoor air quality data, and the air quality assessment can comprise a recommendation to install one or more second local sensors to improve accuracy of the second outdoor air quality data.

In some embodiments, the air quality assessment can comprise an uncertainty map indicating levels of accuracy of the first set of outdoor air quality data for a plurality of different regions, and the instructions can cause the one or more processors to generate a customer interest map indicating customer interest in air quality information. The instructions can also cause the one or more processors to generate a combination of the uncertainty map and the customer interest map. The instructions can also cause the one or more processors to identify, using the combination of the uncertainty map and the customer interest map, one or more first areas having a customer interest in air quality information where the level of accuracy of the first set of outdoor air quality data is below a certain level, and generate a recommendation to install one or more second local sensors for one or more buildings in the one or more first areas.

In some embodiments, the instructions can cause the one or more processors to assess how representative one or more locations of the one or more local sensors are of an overall outdoor air quality of the building, and generate, responsive to assessing how representative the one or more locations of the one or more local sensors are of the overall outdoor air quality of the building, a recommendation to install one or more second local sensors.

At least one embodiment of the present disclosure relates to a method for monitoring and/or controlling air quality of a building. The method can include obtaining, by one or more processors from a regional air quality data source, a first set of outdoor air quality data, wherein the first set of outdoor air quality data represents air quality measured for a region including the building or proximate to the building. The method can also include obtaining, by the one or more processors from one or more local sensors coupled to and/or positioned proximate to the building, a second set of outdoor air quality data, wherein the second set of outdoor air quality data represents air quality measurements at one or more positions at or near an exterior of the building, and generating, by the one or more processors using the first set of outdoor air quality data and the second set of outdoor air quality data, an air quality assessment for the building.

In some embodiments, the method can include obtaining, by the one or more processors from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model. The method can also include obtaining, by the one or more processors from the one or more local sensors, a third set of outdoor air quality data, wherein the third set of outdoor air quality data corresponds to the given first point in time. The method can also include determining, by the one or more processors using the first future air quality value of the plurality of future air quality values and the third set of outdoor air quality data, a localized air quality value for the building at the given first point in time, and generating, by the one or more processors using the second future air quality value of the plurality of future air quality values and the third set of outdoor air quality data, a second localized air quality value for the building for the given second point in time, wherein the second localized air quality value for the building is a predicted value.

In some embodiments, the air quality assessment for the building can include a predicted indoor air quality value for the building for a future point in time, and the method can include obtaining, by the one or more processors from the regional air quality data source, a predicted outdoor air quality value for the region including the building or proximate to the building, wherein the predicted outdoor air quality value for the region is generated by a regional model and the predicted outdoor air quality value for the region pertains to the future point in time. The method can also include obtaining, by the one or more processors from the one or more local sensors, a third set of outdoor air quality data, wherein the third set of outdoor air quality data pertains to outdoor air quality data prior to the future point in time. The method can also include updating, by the one or more processors using at least a portion of the third set of outdoor air quality data and the predicted outdoor air quality value for the region, the predicted indoor air quality value for the building for the future point in time, and determining, by the one or more processors using a fourth set of outdoor air quality data, an actual air quality value for the building at the future point in time, wherein the actual air quality value for the building at the future point in time is used to update the regional model that generated the predicted outdoor air quality value for the region.

In some embodiments, the air quality assessment for the building can include an air quality value for the building, and the can include generating, by the one or more processors using the air quality value for the building, a plurality of recommendations, the plurality of recommendations including a plurality of control actions to improve the air quality value for the building. The method can also include providing, by the one or more processors to a user device, the plurality of recommendations. The method can also include receiving, by the one or more processors from the user device, a selection of a first recommendation of the plurality of recommendations, and implementing, by the one or more processors responsive to receiving the selection of the first recommendation of the plurality of recommendations, control actions included in the first recommendation of the plurality of recommendations.

In some embodiments, the air quality assessment can comprise an uncertainty assessment indicating a level of accuracy of the first set of outdoor air quality data or the second set of outdoor air quality data, and the air quality assessment can comprise a recommendation to install one or more second local sensors to improve accuracy of the second outdoor air quality data.

In some embodiments, the air quality assessment can comprise an uncertainty map indicating levels of accuracy of the first set of outdoor air quality data for a plurality of different regions, and the method can include generating, by the one or more processors, a customer interest map indicating customer interest in air quality information. The method can also include generating, by the one or more processors, a combination of the uncertainty map and the customer interest map. The method can also include identifying, by the one or more processors using the combination of the uncertainty map and the customer interest map, one or more first areas having a customer interest in air quality information where the level of accuracy of the first set of outdoor air quality data is below a certain level, and generating, by the one or more processors, a recommendation to install one or more second local sensors for one or more buildings in the one or more first areas.

In some embodiments, the method can include assessing, by the one or more processors, how representative one or more locations of the one or more local sensors are of an overall outdoor air quality of the building, and generating, by the one or more processors responsive to assessing how representative the one or more locations of the one or more local sensors are of the overall outdoor air quality of the building, a recommendation to install one or more second local sensors.

At least one embodiment of the present disclosure relates to one or more non-transitory storage medium. The one or more non-transitory storage medium can store instructions that, when executed by one or more processors, cause the one or more processors to implement operations including obtaining, from a regional air quality data source, a first set of outdoor air quality data, wherein the first set of outdoor air quality data represents air quality measured for a region including a building or proximate to the building. The operations also including obtaining, from one or more local sensors coupled to and/or positioned proximate to the building, a second set of outdoor air quality data, wherein the second set of outdoor air quality data represents air quality measurements at one or more positions at or near an exterior of the building, and generating, using the first set of outdoor air quality data and the second set of outdoor air quality data, an air quality assessment for the building.

In some embodiments generating the air quality assessment for the building can include executing a model, using at least a portion of the first set of outdoor air quality data and at least a portion of the second set of outdoor air quality data as inputs to the model, to determine, based on a comparison of the at least a portion of the first set of outdoor air quality data and at least a portion of the second set of outdoor air quality, a weight metric correlating the at least a portion of the first set of outdoor air quality data with the at least a portion of the second set of outdoor air quality data, and generate, using the weight metric, a predicted air quality value for the building. The model can be trained using data correlating local air quality data with regional air quality data, and the predicted air quality value for the building can be determined relative to outdoor air quality proximate to the building.

In some embodiments, the operations can include obtaining, from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model. The operations can also include obtaining, from the one or more local sensors, a third set of outdoor air quality data, wherein the third set of outdoor air quality data corresponds to the given first point in time. The operations can also include determining, using the first future air quality value of the plurality of future air quality values and the third set of outdoor air quality data, a localized air quality value for the building at the given first point in time, and generating, using the second future air quality value of the plurality of future air quality values and the third set of outdoor air quality data, a second localized air quality value for the building for the given second point in time, wherein the second localized air quality value for the building is a predicted value.

In some embodiments, the air quality assessment for the building can include a predicted indoor air quality value for the building for a future point in time and the operations can include obtaining, from the regional air quality data source, a predicted outdoor air quality value for the region including the building or proximate to the building, wherein the predicted outdoor air quality value for the region is generated by a regional model and the predicted outdoor air quality value for the region pertains to the future point in time. The operations can also include obtaining, from the one or more local sensors, a third set of outdoor air quality data, wherein the third set of outdoor air quality data pertains to outdoor air quality data prior to the future point in time. The operations can also include updating, using at least a portion of the third set of outdoor air quality data and the predicted outdoor air quality value for the region, the predicted indoor air quality value for the building for the future point in time, and determining, using a fourth set of outdoor air quality data, an actual air quality value for the building at the future point in time, wherein the actual air quality value for the building at the future point in time is used to update the regional model that generated the predicted outdoor air quality value for the region.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the figures, systems and methods for using outdoor air quality forecasting to manage (e.g., monitor and/or control) indoor air quality for a building are shown. According to various example embodiments, the air quality detection system can include air quality detectors positioned at one or more locations in or near the building. The air quality detectors are configured to collect data regarding the air quality of the locations. In some embodiments, the air quality detectors can be deployed temporarily (e.g., as a service) and removed at the end of the monitoring/test period. In other embodiments, the air quality detectors may be permanently installed. A detection controller can obtain the air quality data from each of the air quality detectors. The air quality data can be used to generate one or more outdoor air quality forecasts. In some embodiments, the air quality detection system may additionally, or alternatively, be configured to receive regional air quality data from one or more regional air quality data sources (e.g., a weather service) configured to provide air quality data for regions including, or regions proximate to, a building. In some such embodiments, the air quality detection system may receive data from either local sensors or from one or more regional air quality data sources and use the data to assess outdoor and/or indoor air quality for a building. In some embodiments, the air quality detection system may receive data from both one or more local sensors and one or more regional air quality data sources and assess the outdoor and/or indoor air quality for the building using a combination of data from the sources. In some embodiments, the air quality detection system may be configured to assess an accuracy of the outdoor air quality data and provide the assessment to a user and/or recommend actions to improve the accuracy of the data, such as installation of one or more local sensors (or one or more additional local sensors, if some local sensors are already installed). In some embodiments, the air quality detection system may provide recommendations based in part on information about areas of customer interest/demand for outdoor air quality data.

While the present disclosure discusses various examples in the context of office buildings, it should be noted that the features of the present disclosure are equally applicable to any type of building or group of building having multiple locations into which detectors can be temporarily or permanently placed. For example, the building may be an airport, an incarceration site, a cruise ship, a hotel, a nursing home, an assisted living facility, etc. Depending on the type of the building 10 and the application thereof, the responsive actions may differ.

Building HVAC Systems and Building Management Systems

Figure 1:
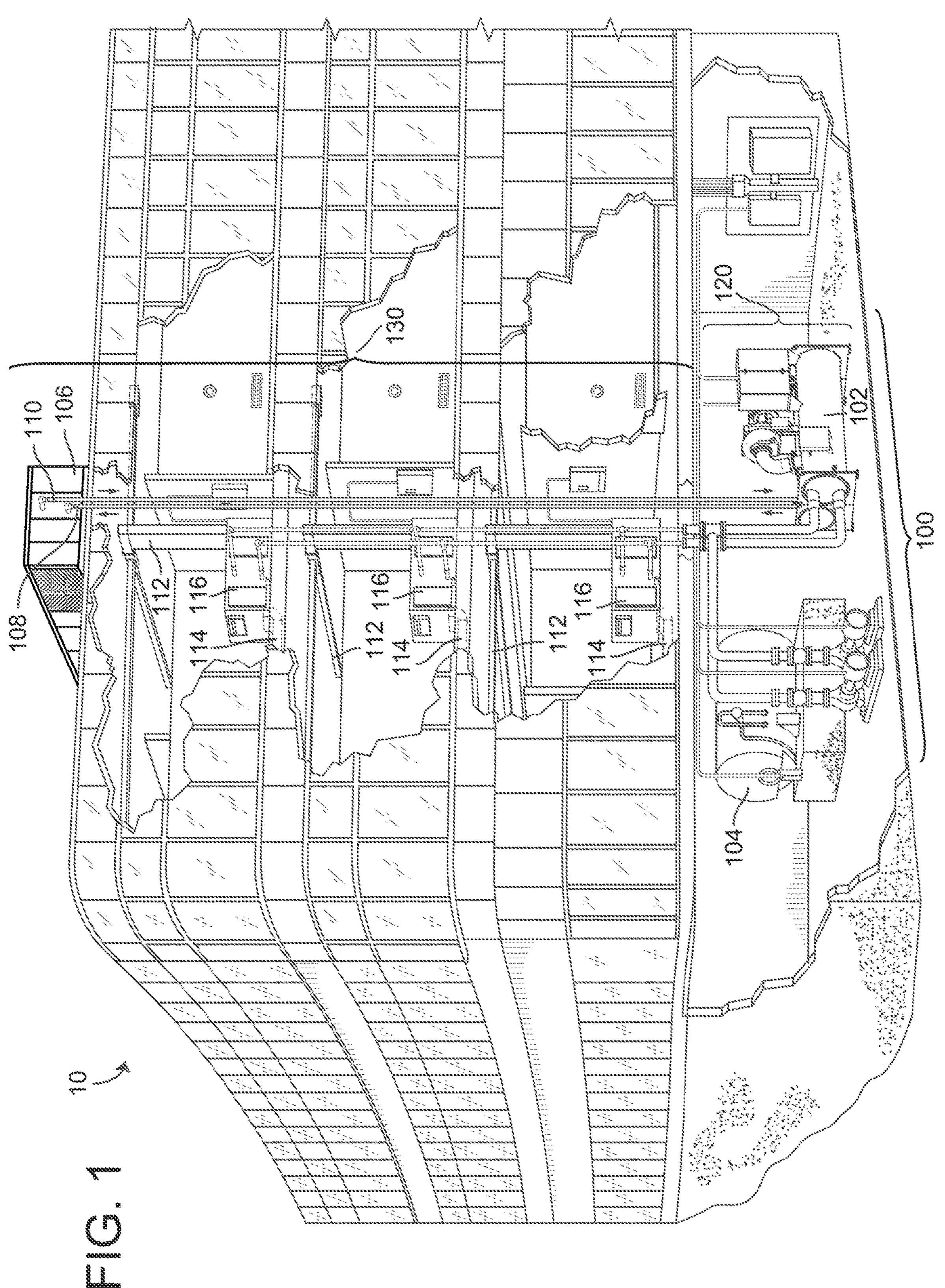
FIG. 1 is a drawing of a building equipped with a HVAC system, according to some embodiments.
Figure 2:
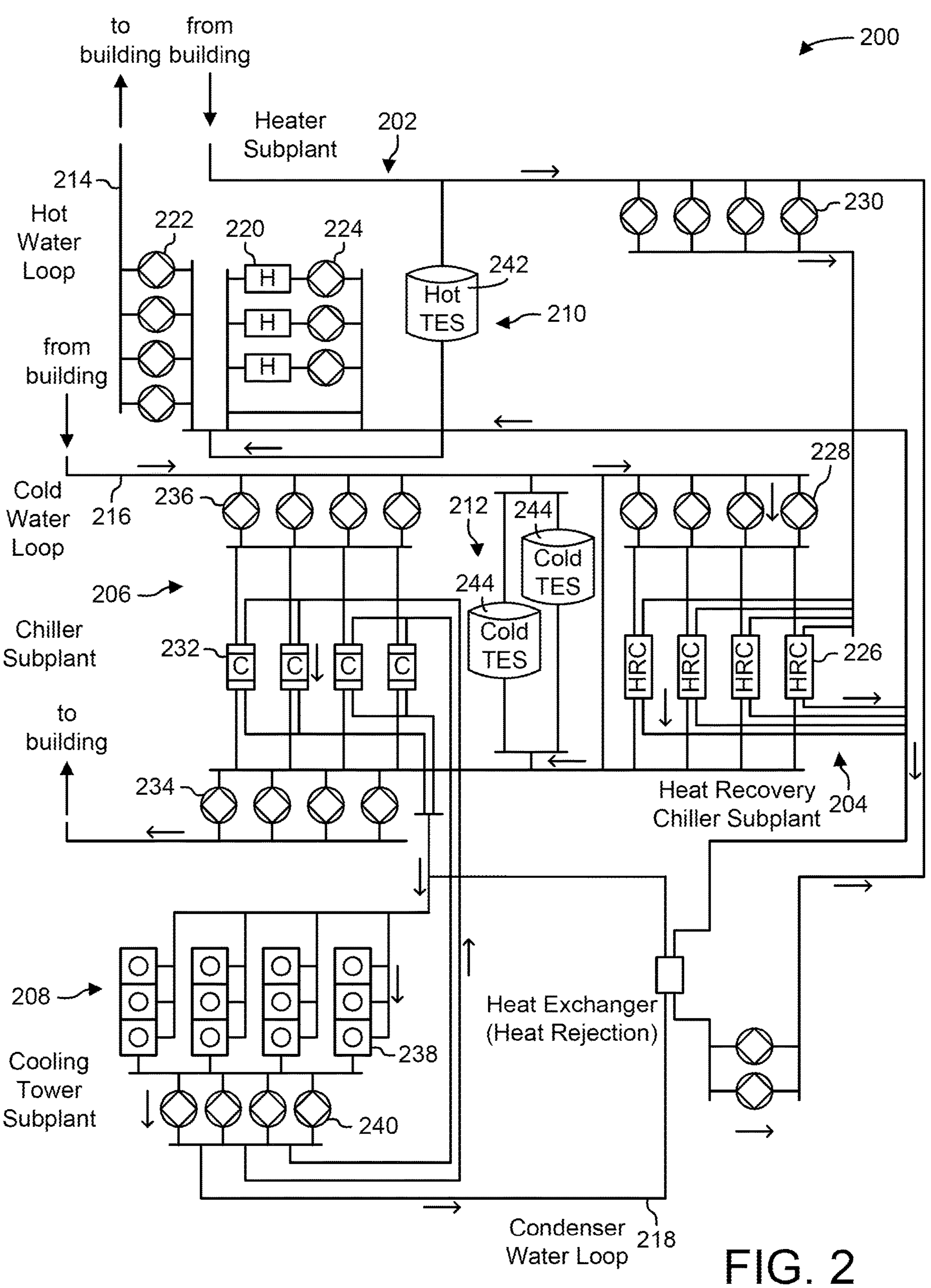
FIG. 2 is a block diagram of a waterside system which can be used to serve the building of FIG. 1, according to some embodiments.
Figure 3:
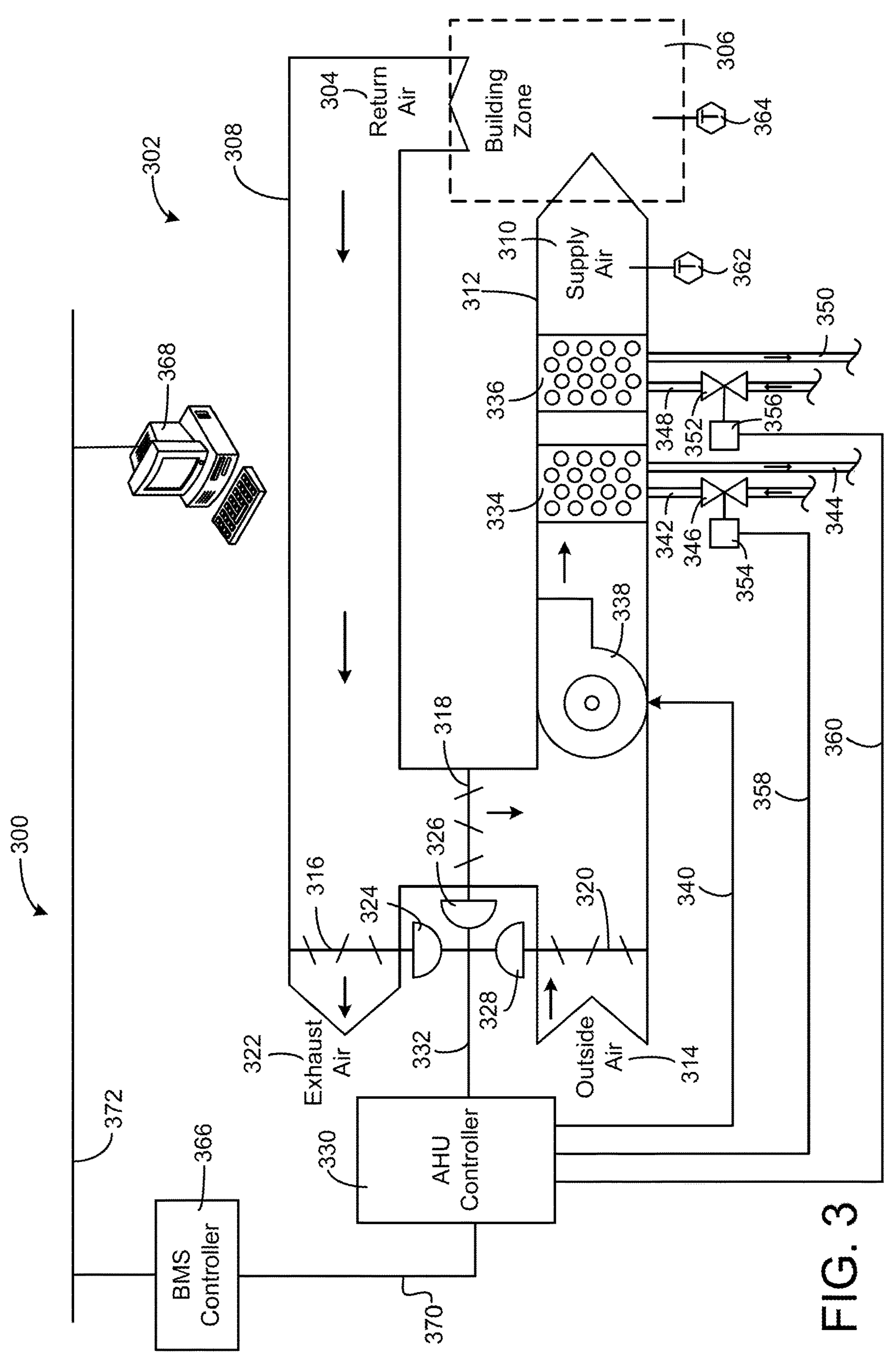
FIG. 3 is a block diagram of an airside system which can be used to serve the building of FIG. 1, according to some embodiments.
Figure 4:
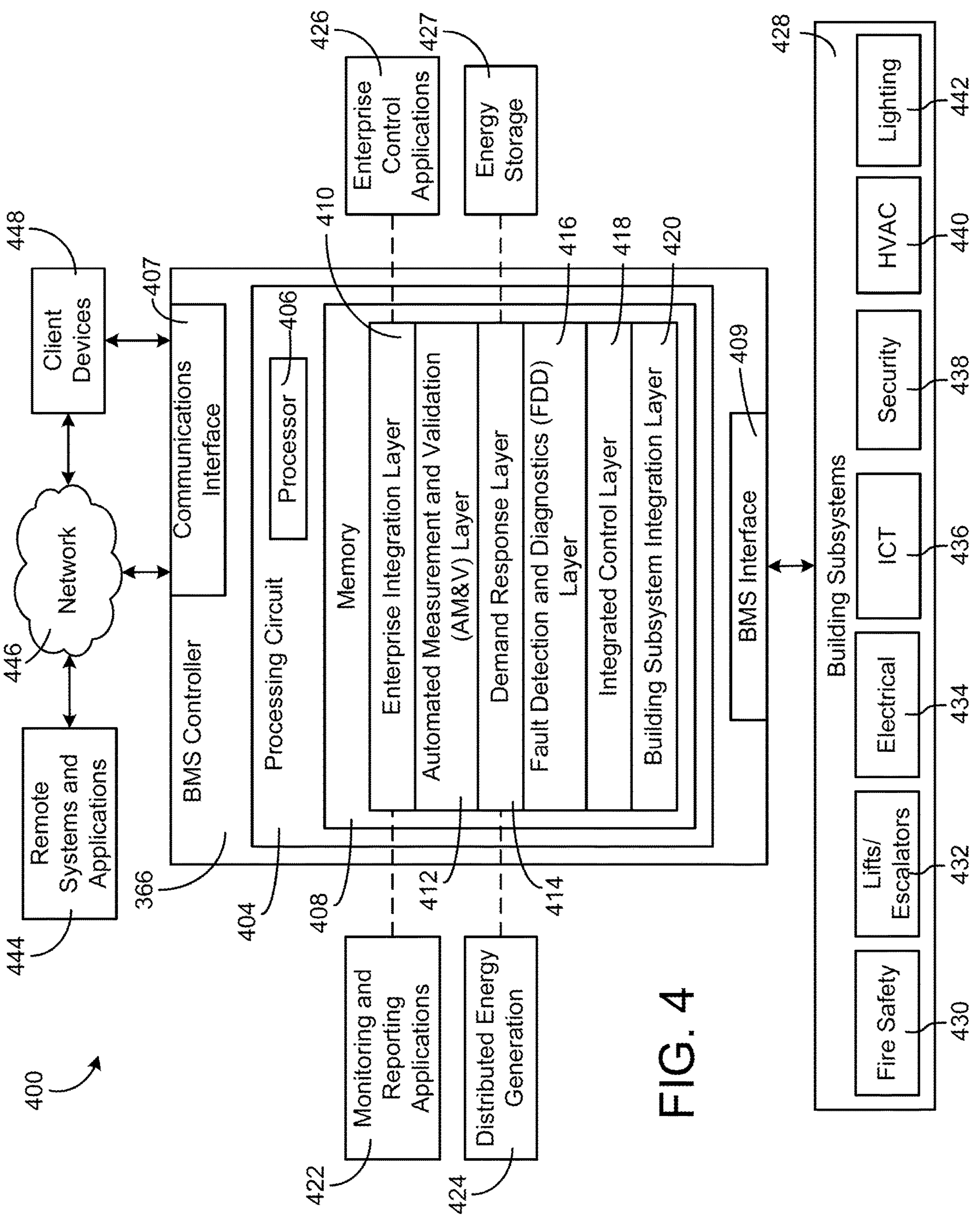
FIG. 4 is a block diagram of a building management system (BMS) which can be used to monitor and control the building of FIG. 1, according to some embodiments.
Figure 5:
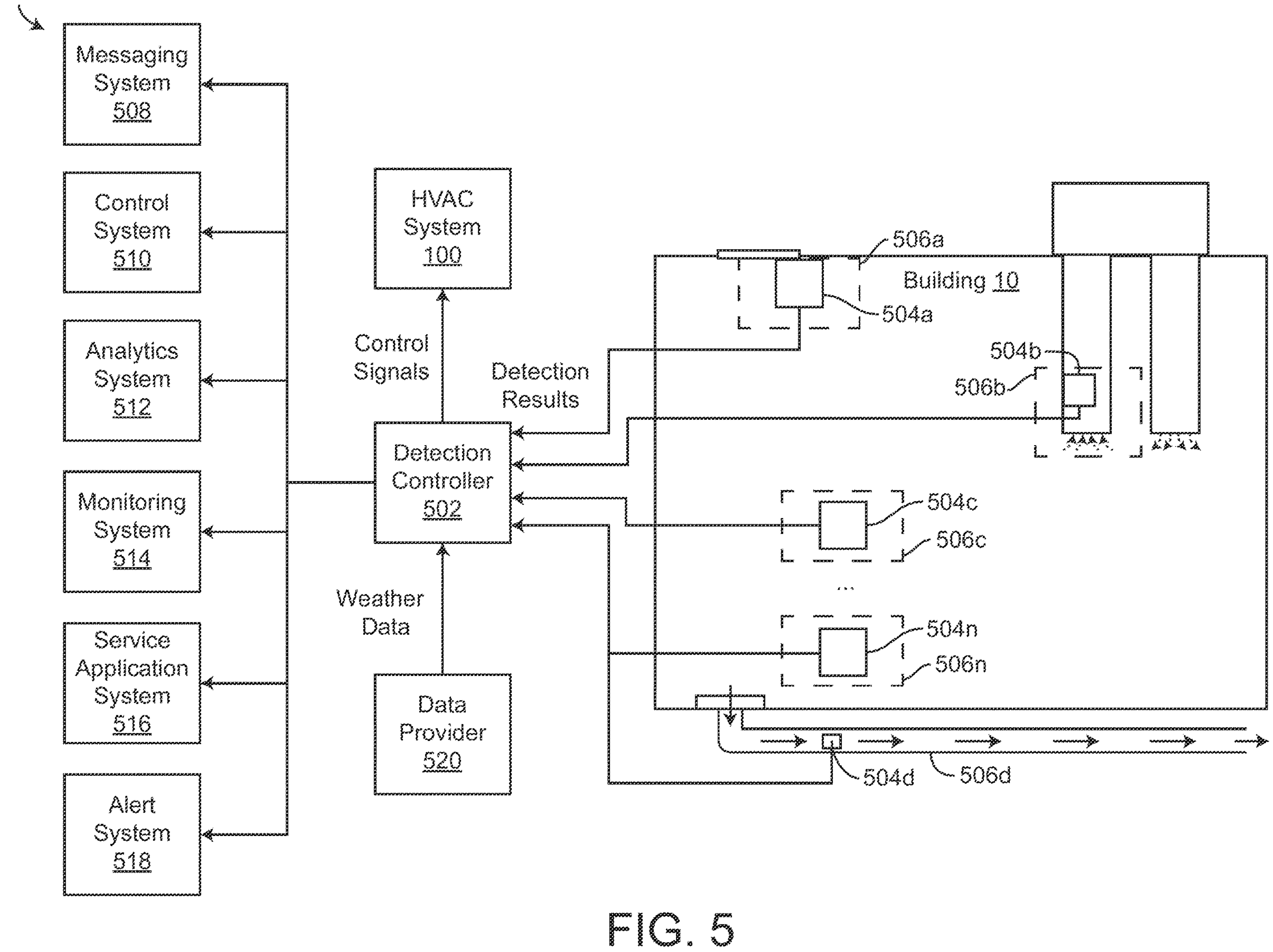
FIG. 5 is a block diagram of an air quality detection system for a building, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (1\413C) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Air Quality Detection System

Referring now to FIG. 5, an air quality detection system 500 for building 10 is shown, according to some embodiments. Any of the functionality of the air quality detection system 500 as described herein may be implemented in any of the BMS as described in greater detail above with reference to FIGS. 1-4. As shown in FIG. 5, the air quality detection system 500 includes multiple air quality detectors 504 that are positioned throughout building 10. The air quality detectors 504 (e.g., sensors, sensing elements, etc.) can be configured to detect one or more air quality measurements. For example, the air quality detectors 504 can detect air quality measurements that relate to indoor air quality or outdoor air quality. In some embodiments, the air quality measurements can include data corresponding to ventilation for a location, occupancy for a location, CO2 for a location, particulate matter PM1 for a location, particulate matter PM10 for a location, particulate matter PM2.5 for a location, volatile organic compounds (VOC) for a location, total volatile organic compound (TVOC) for a location, thermal measurements for a location, temperature for a location, relative humidity for a location, dew point for a location, ozone for a location, carbon monoxide (CO) for a location, formaldehyde for a location, acetone for a location, mold/mildew for a location, pollen for a location, bacteria for a location, microbial flora (including allergens), viruses for a location and/or any other types of metrics/characteristics for a location. In some embodiments, the air quality measurements can include data corresponding to the weather conditions outside building 10.

The air quality detectors 504 can be positioned in different zones 506 of the building. The zones 506 can be located within or outside of the building 10. In some embodiments, the air quality detectors 504 can be located at a building that is not building 10. The detection controller 502 can obtain the air quality measurements from the air quality detectors 504. The air quality measurements can be location specific. For example, the air quality measurements collected by air quality detector 504*a* can be different than the air quality measurements collected by air quality detector 504*b*. The detection controller 502 can obtain the data from the air quality detectors 504. The air quality detectors 504 can be communicably coupled via a wired connection with the detection controller 502, or wirelessly (e.g., by communicating with the detection controller 502 via Bluetooth, LoRa, Zigbee, via cellular communications, a wireless network, a building WiFi network, etc.).

Detection controller 502 is configured to obtain the detection results from any of the air quality detectors 504 when results are available from the air quality detectors 504 (e.g., in a real-time basis, in near-real time, in 24 hour intervals, etc.). Detection controller 502 can obtain the detection results and analyze the detection results to identify the indoor air quality or the outdoor air quality. The detection controller 502 can be configured to use known locations of the different air quality detectors 504 and generate appropriate data (e.g., commands, analytical data, control signals, alert data, etc.) for any of a messaging system 508, a control system 510, an analytics system 512, a monitoring system 514, one or more service application system 516, and/or an alert system 518, etc., to perform one or more responsive actions in response to identifying the indoor air quality and the outdoor air quality for the building 10. In some embodiments, the detection controller 502 is also configured to generate and/or provide control signals to the HVAC system 100 of the building 10. In some embodiments, the detection controller 502 is configured to determine and provide informative data for the HVAC system 100 for use by the HVAC system 100 in determining control operations thereof. In some embodiments, the detection controller 502 provides different data to any of the messaging system 508, the control system 510, the analytics system 512, the monitoring system 514, the service application system 516, and/or the alert system 518 based on the indoor air quality and the outdoor air quality.

The detection controller 502 can use the indoor air quality and the outdoor air quality to determine which control operations can be performed to maintain or improve the indoor air quality. For example, the outdoor air quality can be used to determine if the outdoor air quality is above a predetermined threshold. If the outdoor air quality is above the predetermined threshold the detection controller 502 can determine that the indoor air quality can be controlled by recirculating and filtering the indoor air. Similarly, in some embodiments the outdoor air quality can be used to determine that the outdoor air quality is below the predetermined threshold. The detection controller 502 can use the outdoor air quality to determine that the indoor air quality can be controlled by recirculating and filtering the indoor air or by circulating outdoor air into the building 10. For example, the outdoor air quality of the building 10 can be impacted by a weather event, such as a forest fire. The detection controller 502 can determine that the indoor air quality can be controlled by closing an outdoor air intake, increasing filtration of the indoor air and recirculating the indoor air. In some embodiments, the detection controller 502 can use the indoor air quality and the outdoor air quality to determine that an indoor air quality metric is a result of the outdoor air quality. For example, the indoor PM 2.5 metric can be impacted by the pollen metric outside the building 10. Additionally, the detection controller 502 can determine that the indoor PM 2.5 metric can be improved by closing the outdoor air intake.

In some embodiments, the detection controller 502 is located on-site at building 10. In some embodiments, any of the systems 508-518 are located off-site (e.g., in a cloud computing system as part of a service). In some embodiments, the detection controller 502 is also located off-site (e.g., in a cloud computing system) and communicates with the air quality detectors 504 to obtain detection results.

In some embodiments, the detection controller 502 is configured to receive weather data from a data provider 520. The data provider 520 can be a database configured to provide seasonal and/or current weather data. The detection controller 502 may adjust the indoor air quality measurements or the outdoor air quality measurements based on the weather data. The detection controller 502 can use the data provided by the data provider 520.

Referring still to FIG. 5, the detection controller 502 can be configured to operate the control system 510 and/or initiate one or more actions of the control system 510. The detection controller 502 may provide any of the detection results. The control system 510 can be configured to use any of the detection results in a high level control logic application to determine when to activate and deactivate certain control operations. In some embodiments, the control operations include any of, or any combination of, drawing fresh outdoor air (e.g., increasing an air-intake fraction) to improve fresh air ventilation, operating one or more filtration devices (e.g., filtration devices positioned locally in the building 10, filtration devices positioned in the HVAC system 100 of the building 10, etc.), and/or operating one or more ultraviolet (UV) lights to control the indoor air quality. In some embodiments, the control operations include any of, or any combination of, decreasing the air-intake fraction to prevent outdoor air from entering the building 10, recirculating the indoor air and/or operating one or more filtration devices. In some embodiments, the control system 510 is configured to use the data provided by the detection controller 502 to determine an appropriate control operation.

In some embodiments, the control system 510 is configured to use the air quality data obtained by the air quality detectors 504 and/or any outputs of the detection controller 502 as inputs to, or to train models of the systems and methods described in greater detail in U.S. application Ser. No. 16/927,759, filed Jul. 13, 2020, the entire disclosure of which is incorporated by reference herein.

Referring still to FIG. 5, the detection controller 502 is configured to provide outputs to the analytics system 512, according to some embodiments. In some embodiments, the outputs provided from the detection controller 502 to the analytics system 512 are the same as the outputs provided by the detection controller 502 to the control system 510. The analytics system 512 is configured to use feedback regarding the air quality measurements (e.g., the detection results) to validate and/or improve one or more prediction models (e.g., a Wells-Riley based prediction model such as for predicting air quality metrics). In some embodiments, the analytics system 512 can include a predictive model that is configured to combine both a deterministic prediction portion and a stochastic correction. The deterministic prediction portion can be based on various equations (e.g., the Wells-Riley equation), and the stochastic correction can be adjusted, generated, determined, updated, etc., based on the detection results provided to the analytics system 512 by the detection controller 502 to improve an accuracy of the predictive model. The stochastic correction may be an adaptive portion of the predictive model. The predictive model can be updated and provided to the control system 510 for use in initiating the control operations. In some embodiments, the outputs provided by the detection controller 502 (e.g., any of the data gathered by the detection controller 502 from the air quality detectors 504, or any of the responses performed and subsequently obtained data) may be used to calibrate, update, or be any other input to any of the models described in greater detail with reference to PCT/US2020/041845, filed Jul. 13, 2020, the entire disclosure of which is incorporated by reference herein.

Referring still to FIG. 5, the detection controller 502 is configured to provide the outputs to the monitoring system 514, according to some embodiments. In some embodiments, the monitoring system 514 includes, or is in communication with, one or more display devices, notification systems, etc. The monitoring system 514 may be a back-end monitoring system for an administrator of the building 10. In some embodiments, the monitoring system 514 communicates with any of the messaging system 508, the control system 510, the analytics system 512, the service application system 516, the alert system 518, the HVAC system 100, a BMS of the building 10, etc., so that the monitoring system 514 can obtain operational data thereof. In some embodiments, the monitoring system 514 is configured to generate dashboards, user-interfaces, graphical user interfaces, graphs, charts, diagrams, tabular data, etc., of any of the messaging system 508, the control system 510, the analytics system 512, the service application system 516, the alert system 518, the HVAC system 100, the BMS of building 10, and/or the detection controller 502 based on operational data, sensor data, analytic data, etc., thereof. For example, the monitoring system 514 can generate a dashboard that demonstrates the air quality of the locations in or near the building 10. In some embodiments, the monitoring system 514 is configured to use any of the data obtained by or determined by the detection controller 502 in combination with the techniques as described in U.S. application Ser. No. 16/927,281, filed Jul. 13, 2020, to generate visualizations or dashboards, the entire disclosure of which is incorporated by reference herein.

Referring still to FIG. 5, the detection controller 502 is configured to provide the outputs to the service application system 516, according to some embodiments. In some embodiments, the service application system 516 is configured to identify sales opportunities based on the outputs of the detection controller 502. For example, the service application system 516 can identify sales opportunities (e.g., service opportunities) such as dirty coils, dirty or slimy condensate pans, dirty filters, mold, excessive particulate matter or dust, etc. The service application system 516 can initiate a service (e.g., scheduling, contracting, etc.) to address to the different sales opportunities, according to some embodiments. In some embodiments, samples from the services are provided to a lab (e.g., mailed to a lab) for baseline assessment. When future services are scheduled and implemented, the service application system 516 can validate effectiveness of mitigation solutions performed at the building 10 relative to the baseline assessment using lab results of subsequently obtained samples. The service application system 516 can also optimize resource dispatching. For example, the service application system 516 can prompt technicians, work crews, individuals, etc., with proper skills, training, and equipment to address different identified sales opportunities (e.g., to clean filters of the HVAC system 100, to replace faulty UV lights, etc.). In some embodiments, the service application system 516 is configured to perform an optimization to determine optimal scheduling of work crews or technicians to address the different sales opportunities.

Referring still to FIG. 5, the various systems (e.g., the messaging system 508, the control system 510, the analytics system 512, the monitoring system 514, the service application system 516, the alert system 518, etc.) may be components of the detection controller 502, or may be components of other processing circuitry (e.g., distributed processing circuitry, cloud computing systems, etc.). It should be understood that while the detection controller 502 is described herein as determining responsive actions for each of the messaging system 508, the control system 510, the analytics system 512, the monitoring system 514, the service application system 516, the alert system 518, and the HVAC system 100, the detection controller 502 may, in some embodiments, be configured to only determine responsive actions for one or more of the messaging system 508, the control system 510, the analytics system 512, the monitoring system 514, the service application system 516, the alert system 518, etc.

Figure 6:
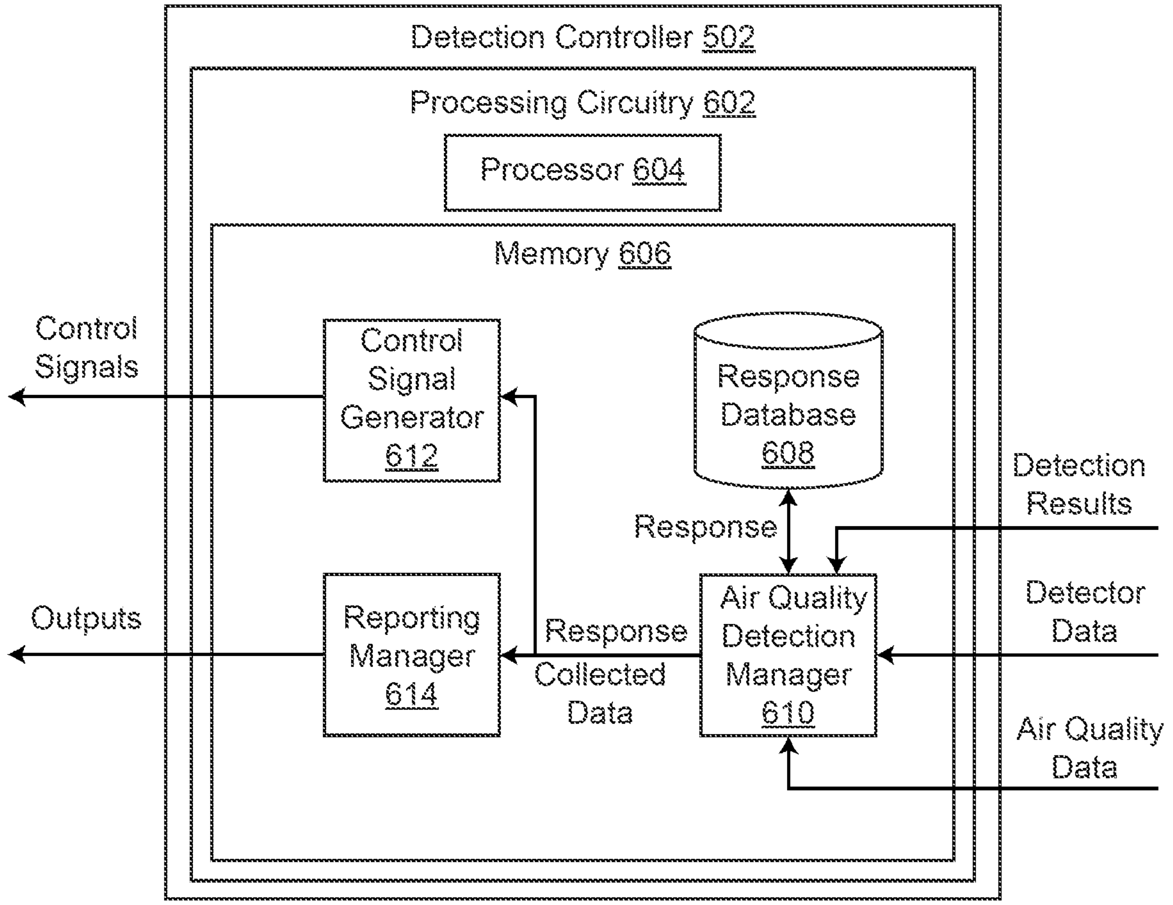
FIG. 6 is a block diagram of a detection controller of the air quality detection system of FIG. 5, according to some embodiments.

Referring particularly to FIG. 6, the detection controller 502 is shown in greater detail, according to some embodiments. The detection controller 502 is shown to include processing circuitry 602 including a processor 604 and memory 606. Processing circuitry 602 can be communicably connected to a communications interface such that processing circuitry 602 and the various components thereof can send and receive data via the communications interface. Processor 604 can be implemented as a general purpose processor, an application specific integrated circuit (ASIC), one or more field programmable gate arrays (FPGAs), a group of processing components, or other suitable electronic processing components.

Memory 606 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 606 can be or include volatile memory or non-volatile memory. Memory 606 can include database components, object code components, script components, or any other type of information structure for supporting the various activities and information structures described in the present application. According to some embodiments, memory 606 is communicably connected to processor 604 via processing circuitry 602 and includes computer code for executing (e.g., by processing circuitry 602 and/or processor 604) one or more processes described herein.

As shown in FIG. 6, memory 606 includes a response database 608, an air quality detection manager 610, a control signal generator 612, and a reporting manager 614, according to some embodiments. The air quality detection manager 610 is configured to receive detection results (e.g., airborne samples, surface samples) from the air quality detectors 504, according to some embodiments. In some embodiments, the air quality detection manager 610 is also configured to obtain detector data from each of the air quality detectors 504. The detector data may include information regarding a type of detector, a location of the detector in the building 10, a model of the detector, installation data of the detector, measurement errors or uncertainties, control parameters, configuration data, etc. In some embodiments, the air quality detection manager 610 is configured to determine or select an appropriate response from the response database 608 based on the detection results and the detector data. For example, the air quality detection manager 610 can be configured to determine the indoor air quality and/or the outdoor air quality based on the detector data, according to some embodiments. In another example, the air quality detection manager 610 can be configured to determine a location of the indoor air quality and/or the outdoor air quality based on the detector data, according to some embodiments. In some embodiments, the detector data also includes a magnitude or level of indication of the detection at each of the air quality detectors 504. The magnitude or level of indication of the detection can be a building-wide indication, a floor-wide indication, a zone-wide indication, a room-wide indication, etc., according to some embodiments. For example, a detector that is placed within a return air duct of the building 10 (e.g., air quality detector 504*b*) that draws air from a zone including multiple rooms or sub-zones may report a zone-wide level of indication or magnitude, according to some embodiments. In yet another example, a detector that is placed within a single room (e.g., air quality detector 504*a*) may report a room-wide level of indication or magnitude, according to some embodiments. In this way, the positioning and configuration of the detectors can indicate a degree of locality (e.g., a spatialization) of air quality detection in the building 10. The air quality detection manager 610 may determine the degree of locality based on the detector data for each of the air quality detectors 504, or may receive the degree of locality from each of the air quality detectors 504.

The air quality detection manager 610 can use any of the detection results, the detector data (e.g., the degree of locality of each of the air quality detectors 504) to determine or select a control action (e.g., a responsive action) from the response database 608. The air quality detection manager 610 can detect the indoor air quality and/or the outdoor air quality. The air quality detection manager 610 can select the control operation described herein to control the indoor air quality.

In some embodiments, the air quality detection manager 610 is configured to provide the control operation and/or any of the collected data to the reporting manager 614 and/or the control signal generator 612. The control signal generator 612 can generate control signals for equipment of the building 10 to implement the control operation, according to some embodiments. In some embodiments, the control signals are provided to the HVAC system 100. In some embodiments, the reporting manager 614 is configured to provide any of the control operations, or the collected data to any of the messaging system 508, the control system 510, the analytics system 512, the monitoring system 514, the service application system 516, or the alert system 518 so that the systems 508-518 can perform their respective functions.

Process

Figure 7:
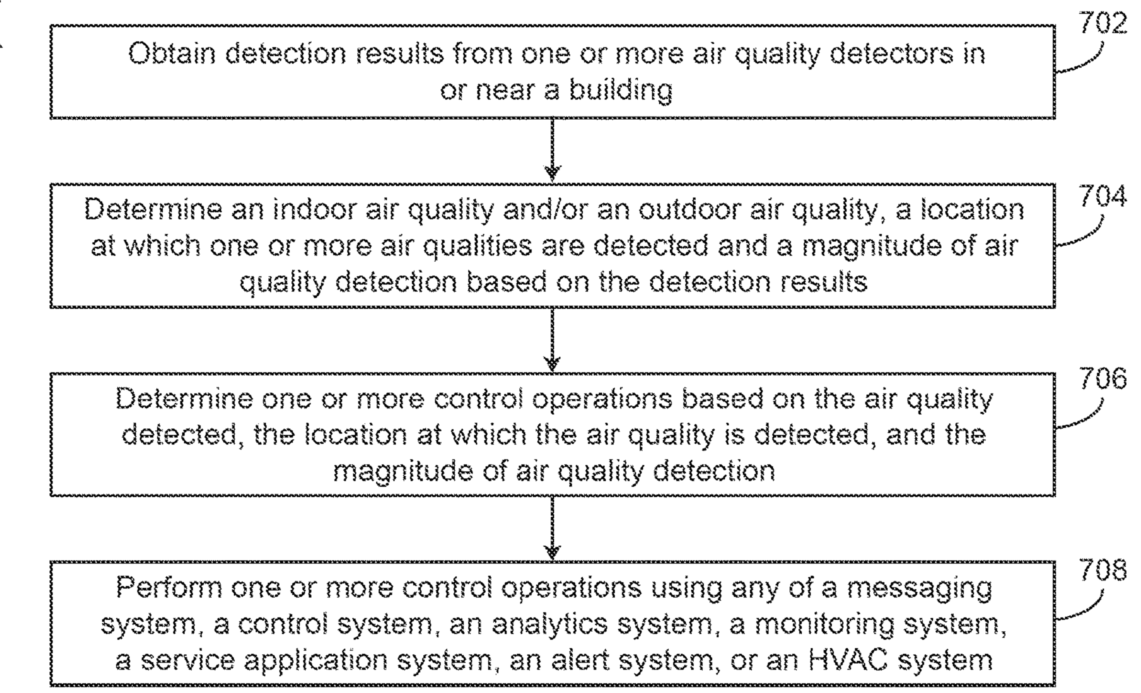
FIG. 7 is a flow diagram of a process for performing air quality detection and control operations, according to some embodiments.

Referring to FIG. 7, a process 700 for performing air quality detection for a building and performing one or more control operations is shown, according to some embodiments. The process 700 can be performed by the detection controller 502 and/or the air quality detection system 500 as described in greater detail above with reference to FIGS. 5-6. Process 700 includes steps 702-708, according to some embodiments. Process 700 can be performed using real-time or delayed detection results.

Process 700 includes obtaining detection results from one or more air quality detectors in a building (step 702), according to some embodiments. The air quality detectors can be air quality detectors 504, according to some embodiments. In some embodiments, the air quality detectors are or include static detectors (e.g., stationary and installed in a fixed location of the building). In some embodiments, the air quality detectors are positioned at locations in or near the building (e.g., locations in and around the building). Locations of the air quality detectors (e.g., floor, room, zone, etc.)

may be known and can be used in steps 704-708, according to some embodiments. The air quality detectors can also include a mobile unit including an air quality detector that is configured to translate or move throughout the building, according to some embodiments. In some embodiments, step 702 is performed by the detection controller 502 and the air quality detectors 504 as described in greater detail above with reference to FIGS. 5-6. Step 702 can also include obtaining seasonal and/or current weather data for a region (e.g., a state, a country, a city, a country, a province, etc.) in which the building is located.

Process 700 includes determining the indoor air quality and/or the outdoor air quality, a location at which the air quality is detected (step 704), according to some embodiments. Step 704 can be performed by the detection controller 502, according to some embodiments. The indoor air quality and/or the outdoor air quality may be an output of any of the air quality detectors. In some embodiments, the locations at which the air quality is detected are determined based on known locations of the air quality detectors. For example, if an air quality detector has a unique identification, the detection controller 502 may use the unique identification and a database to identify the location of the air quality detector. In some embodiments, the detection results (e.g., data provided by the air quality detectors) include information indicating the location of each air quality detector. For example, each air quality detector may report (e.g., to the detection controller 502) its location in the building (e.g., the building 10).

In some embodiments, the location of the air quality detector changes (e.g., if the air quality detector is mounted on a device, apparatus, or unit configured to translate throughout the building). The air quality detector may be configured to wirelessly communicate to provide current detection data and current location in the building (e.g., wirelessly communicate with the detection controller 502).

Process 700 includes determining one or more control operations based on the indoor air quality and/or the outdoor air quality and/or the location at which the air quality is detected (step 706), according to some embodiments. In some embodiments, step 706 is performed by the detection controller 502 and/or one or more systems, devices, etc., that are communicably coupled with the detection controller 502 (e.g., the messaging system 508, the control system 510, the analytics system 512, the monitoring system 514, the service application system 516, the alert system 518, the HVAC system 100, etc.). In some embodiments, the control operations are determined by the detection controller 502 and provided to appropriate external systems that are configured to perform the control operations. In some embodiments, determining the control operations includes determining a magnitude of the control operation and determining a locale magnitude of the control operation. The locale magnitude can be determined based on a location or configuration of the detector at which the air quality is detected, according to some embodiments.

The control operations can include any of, or any combination of, messaging actions, control actions, analytics actions, monitoring actions, service application initiations, alerting actions, adjustments to an HVAC system of the building, etc. The messaging actions can include any of providing a text message, an email, a notification, etc., to one or more occupants of the building, occupants of a particular zone of the building (e.g., where the air quality is detected), employees that work in the building, etc. The control operations can include activation and/or determination of one or more control sequences (e.g., activating UV lights to kill pathogens in the building, increasing a fresh-air intake fraction of an AHU of the building, advanced filtration techniques, etc.). The control operations can be targeted to affect a particular zone or area of the building (e.g., based on the location of the air quality). The analytics actions can include using the detection results (e.g., real-world detection results) to update or adjust a predictive model (e.g., a Wells-Riley based predictive model) for use in determining high level control decisions to manage air quality in the building. For example, the predictive model can include a deterministic portion and a stochastic adjustment, with the stochastic adjustment being updated or changed based on the detection results.

The monitoring actions can include generation of dashboards, user interfaces, reporting data, tabular data, graphs, graphical data, graphical user interfaces, etc., of the building. The monitoring actions can also include generation of an operation of any other system associated with the building that may be relevant to air quality in and/or near the building (e.g., what control sequences are implemented, potential control operations, occupancy data in the building or different zones of the building, etc.). The dashboards, reporting data, tabular data, graphs, etc., can be presented to an administrator of the building.

The service application actions can include identifying, based on outputs of step 704 (or the detection controller 502), one or more service opportunities, according to some embodiments. In some embodiments, the service application initiations include scheduling and contracting of one or more services to address the service opportunities. Data can be collected from the implementation of the one or more services to generate baseline data, and subsequent data to identify if infection control sequences that are implemented in the building are effective.

The alerting actions can include determining that alarms or alerts should be provided to occupants of the building, according to some embodiments. The alarms or alerts can be targeted to specific areas, zones, rooms, floors, etc., of the building where the air quality is detected. The types of alarms or alerts can be determined based on the detected air quality.

Process 700 includes performing the one or more control operations using any of a messaging system, a control system, an analytics system, a monitoring system, a service application system, and alert system, or an HVAC system (step 708), according to some embodiments. In some embodiments, step 708 is performed by any of the messaging system 508, the control system 510, the analytics system 512, the monitoring system 514, the service application system 516, the alert system 518, or the HVAC system 100 of the building 10 (shown in FIG. 5).

It should be understood that while steps 706-708 describe multiple different types of responsive actions, process 700 does not require all of the responsive actions to be determined and performed. In some embodiments, steps 706-708 only include one or more of the responsive actions for the messaging system, the control system, the analytics system, the monitoring system, the service application system, the alert system, or the HVAC system. For example, the responsive actions may only include messaging actions, and consequently step 708 only includes "perform the responsive action using the messaging system."

Outdoor Air Quality Data

In some embodiments of the present disclosure, outdoor air quality information may be obtained and used to monitor, assess, and/or take actions based upon the outdoor air quality for or proximate to a building. For example, outdoor air quality information may be obtained from one or more regional air quality data sources configured to provide air quality data representative of measured air quality for a region including the building or proximate to the building. In some embodiments, outdoor air quality information may be obtained from one or more local sensors coupled to and/or positioned proximate to the building and configured to generate outdoor air quality measurements at one or more positions at or near an exterior of the building. In some embodiments, the outdoor air quality information may be obtained from a combination of one or more regional air quality data sources and one or more local sensors. In various implementations, the outdoor air quality information may be used, alone or in combination with other information such as indoor air quality data, to monitor and/or assess outdoor and/or indoor air quality of the building and/or to make decisions or take actions with respect to the outdoor and/or indoor air quality of the building. For example, in some implementations, a building management system may determine whether to ingest outdoor air into the building (i.e., replace indoor air with outdoor air), or a rate at which to ingest the outdoor air, based on the outdoor air quality data. In various embodiments, features described below could be used in conjunction with one or more of any of the features described above (e.g., the actions described above), and vice versa. In some embodiments, features described below may be implemented in part or in whole by building management systems and/or air quality detection systems such as those described above and shown in the present figures.

Knowledge of outdoor air quality can be a useful parameter in managing the indoor air quality in a building. For diagnostic purposes, outdoor air quality measures provide context for indoor air quality measures. For example, high levels on PM 2.5 in a building may simply be the result of a pollen event outdoors.

For control purposes, knowing the outdoor air quality can inform when it is better to recirculate and filter indoor air vs bringing in fresh outdoor air. For example, in the event of a forest fire, it would be advantageous to close the outdoor air intake to prevent bringing smoke into the building.

In some embodiments, the building management system may obtain outdoor air quality data from one or more regional air quality data sources configured to provide air quality data representative of measured air quality for a region including the building or proximate to the building. In some such embodiments, outdoor air quality data may be obtained from an external service such as a weather service provider. Some such providers may leverage high accuracy air quality measurement stations, such as stations supported by government and research organizations, to inform a numerical pollution model. Pollution data for specific locations may be an output of the model. In various implementations, such regional air quality data may be associated with a particular city or town, county, zip code, or any other geographic region. In some implementations, such data may have a low cost and require no maintenance of sensors by a building owner or other service provider other than the weather service provider. In some such implementations, such data may have more limited accuracy in terms of accounting for very local variability in air quality conditions (e.g., air quality conditions isolated to a small area around a building but not affecting an area of the air quality measurement station), and in some circumstances may have a time delay associated therewith (e.g., some such government base stations may have a time delay, such as a four hour delay, in posting data).

In some embodiments, the building management system may obtain outdoor air quality data from one or more local sensors coupled to and/or positioned proximate to the building and configured to generate outdoor air quality measurements at one or more positions at or near an exterior of the building. For example, in some implementations, one or more local air quality sensors configured to measure parameters of the air quality at or near the building may be installed on an exterior of the building, or may be installed in close geographic proximity to the building (e.g., within a certain distance of the building such as a mile of the building, within a block or a certain number of blocks of the building, etc.). In some such embodiments, one or more local sensors may be installed at or proximate to outdoor air intakes of the building, such that the sensors measure air quality parameters at or near where the air is being ingested into the building by air handling units. In some embodiments, multiple local sensors may be used in combination with one another, such that multiple air quality measurements at or proximate to different portions of the building can be used to get a more granular understanding of the outdoor air quality of the building. In some implementations, use of such local sensors may provide data very specific to a particular building/site and can support accounting for/monitoring variables unique to a particular site configuration or needs. Use of such local sensors can introduce costs for maintaining such sensors, either for the building owner or a service provider providing the sensors. In some circumstances, use of local sensors may result in data or decision-making based on data that is too local to the building, such as air quality conditions that affect only one portion of the exterior of the building but are not representative of conditions at air intakes around the building, or conditions that are transient in nature.

In some embodiments, the building management system may obtain outdoor air quality data from both one or more regional air quality data sources and one or more local sensors and monitor and/or assess outdoor and/or indoor air quality conditions and/or take one or more actions based on data from both sources. For example, in some implementations, the building management system may implement or use an outdoor air quality model that takes as inputs data from both the regional air quality data sources and the local sensors. In some embodiments, the model may assess the incoming data and decide which data to use (e.g., based on an assessment of whether the regional air quality data accuracy is above a particular level and/or whether the local air quality data indicates that it has potential issues, such as inconsistencies among multiple sensors). In some embodiments, the model may use both data sets to provide an assessment of the outdoor air quality. For example, in some such embodiments, the model may take into account both sets of air quality measurements in generating an estimated or predicted air quality, such as by using a weighted average of the different measurements. In some embodiments, the model may predict outdoor air quality and/or indoor air quality at one or more future times using the regional air quality data and/or local sensor data, alone or in combination with historical data. In some implementations, the model may predict the outdoor air quality and/or indoor air quality using data from multiple regional air quality data sources (e.g., multiple measurement stations), alone or in combination with weather pattern data. For example, the model may consider current regional air quality data near the building as well as regional air quality data from other regions and weather pattern data to predict when changes in air quality may occur in the future (e.g., based on ash/particulates from a large forest fire in a different region being predicted to travel to the region of the building).

In some implementations, the building management system may be configured to generate an uncertainty assessment (e.g., via an uncertainty assessment tool) indicating a level of accuracy of the outdoor air quality data. In some such implementations, the outdoor air quality data may be obtained from one or more regional air quality data sources, and the uncertainty assessment tool may predict an accuracy of the regional air quality data sources for the building. Such an assessment may be based on, for example, a distance/proximity between the measurement station(s) and the building, air quality data obtained from other local sensors of other buildings proximate to the building and whether such other local sensor data suggests that the regional air quality data is an accurate representation of the air quality data measured by those sensors, etc. In some such implementations, the building management system may identify areas with lower estimated accuracy (e.g., estimated accuracy below a threshold value) and recommend installation of local sensors, or additional local sensors if some local sensors are already installed, at the building. In some implementations, some or all of the air quality data may be received from one or more local sensors, and the system may suggest additional local sensors be installed to improve the accuracy of the outdoor air quality data and/or may suggest supplementing or replacing the local sensor data with regional outdoor air quality data from a regional service provider like a weather service. In some implementations, the air quality uncertainty assessment may be generated as an uncertainty map indicating levels of accuracy of the outdoor air quality data for multiple different regions.

In some implementations, the building management system is configured to collect customer interest data indicating customer interest or demand in air quality data. In some such implementations, the building management system may generate a customer interest map or customer market map indicating locations in which there is customer interest in air quality information, or levels of customer interest in air quality information. In some such implementations, the building management system may overlay the uncertainty map and customer interest map, or generate a combination or cross-reference of the uncertainty map and customer interest map, to identify one or more first areas having a customer interest in air quality information where the level of accuracy of the outdoor air quality data is below a certain level. For example, layering the two maps of top of each other would identify the areas that do not provide a particular level of air quality accuracy and have high a demand for data. These may be the areas that justify investment in local air quality sensors. This would allow for strategic investment in sensors that provide the best benefit to the network at relative to cost. In some such implementations, the building management system may identify these areas where demand is high and accuracy is low and generate recommendations to install one or more local sensors in those areas.

In some implementations, a marketplace for outdoor air quality data may be provided. For example, in areas for local sensors would be beneficial (e.g., air quality data is inaccurate, or below a particular accuracy, customers in the area may be incentivized to install a sensor. For example, in some such implementations, a customer may typically pay $100/month for air quality data. If they install sensor on their site and share the data, the cost may drop to $25/month. In another example, the customer could provide space and electric utilities for a sensor to be supplied by the air quality data provider. For example, a customer may typically pay $100/month for air quality data, and if they provide a place and utilities for the service company's sensor on their site, the cost may drop to $75/month. In some such implementations, the air quality data from the local sensors may be used to generate air quality assessments for the customer and/or for other customers (e.g., other buildings in geographic proximity to the sensors).

In some implementations, such as circumstances in which a customer (e.g., building owner) prefers for some or all of the local sensors to be their own sensors, the building management system may apply a model to determine whether the sensors are providing an accurate picture of the overall outdoor air quality of the building (e.g., whether the sensors are representative of the whole building or a very local area around the sensor). For example, the loading dock may show higher than normal levels of NOx due to truck emissions. If this were the case, the tool could recommend the installation of additional sensors and the recommended location(s). Once the new sensors were installed, the tool could integrate the data into the model to provide air quality data representative of the outdoor air intake throughout the building. In various embodiments, the building management system may recommend replacement of the existing sensors (e.g., with more accurate sensors or sensors with better capabilities), installation of additional sensors (e.g., at additional locations), and/or supplementing the local sensors with data from one or more regional air quality data sources (e.g., such that the model estimating/predicting air quality information is taking into account both the very local information around the building from the local sensors and the less localized regional data from the regional air quality data source(s).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system for monitoring or controlling air quality of a building, the building management system including one or more computer-readable storage media having instructions stored thereon that, when executed by one or more processors, cause the one or more processors to:

obtain, from a regional air quality data source, a first set of outdoor air quality data, wherein the first set of outdoor air quality data represents air quality measured for a region including the building or proximate to the building;

obtain, from one or more local sensors coupled to or positioned proximate to the building, a second set of outdoor air quality data, wherein the second set of outdoor air quality data represents air quality measurements at one or more positions at or near an exterior of the building;

execute a model, using the first set of outdoor air quality data and the second set of outdoor air quality data as input to generate an air quality assessment for the building based at least on determining a correlation factor between the first set of outdoor air quality data and the second set of outdoor air quality data, wherein executing the model to generate the air quality assessment for the building includes:

executing the model, using at least a portion of the first set of outdoor air quality data and at least a portion of the second set of outdoor air quality data as inputs to the model, to:

determine, based on a comparison of at least the portion of the first set of outdoor air quality data and at least a portion of the second set of outdoor air quality data, a weight metric correlating at least the portion of the first set of outdoor air quality data with at least the portion of the second set of outdoor air quality data; and generate, using the weight metric, a predicted air quality value for the building; and wherein the model is trained using data correlating local air quality data with regional air quality data;

wherein the predicted air quality value for the building is determined relative to outdoor air quality proximate to the building; and control, based at least on the air quality assessment, one or more building systems to affect the air quality within the building, by implementing one or more control actions.

2. The building management system of claim 1, wherein the instructions further cause the one or more processors to:

obtain, from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model;

obtain, from the one or more local sensors, a third set of outdoor air quality data, wherein the third set of outdoor air quality data corresponds to the given first point in time;

determine, using the first future air quality value of the plurality of future air quality values and the third set of outdoor air quality data, a localized air quality value for the building at the given first point in time; and generate, using the second future air quality value of the plurality of future air quality values and the third set of outdoor air quality data, a second localized air quality value for the building for the given second point in time, wherein the second localized air quality value for the building is a predicted value.

3. The building management system of claim 1, wherein the air quality assessment for the building includes a predicted indoor air quality value for the building for a future point in time, and wherein the instructions further cause the one or more processors to:

obtain, from the regional air quality data source, a predicted outdoor air quality value for the region including the building or proximate to the building, wherein the predicted outdoor air quality value for the region is generated by a regional model and the predicted outdoor air quality value for the region pertains to the future point in time;

obtain, from the one or more local sensors, a third set of outdoor air quality data, wherein the third set of outdoor air quality data pertains to outdoor air quality data prior to the future point in time;

update, using at least a portion of the third set of outdoor air quality data and the predicted outdoor air quality value for the region, the predicted indoor air quality value for the building for the future point in time; and determine, using a fourth set of outdoor air quality data, an actual air quality value for the building at the future point in time, wherein the actual air quality value for the building at the future point in time is used to update the regional model that generated the predicted outdoor air quality value for the region.

4. The building management system of claim 1, wherein the air quality assessment for the building includes an air quality value for the building, and wherein the instructions further cause the one or more processors to:

generate, using the air quality value for the building, a plurality of recommendations, the plurality of recommendations including a plurality of control actions to improve the air quality value for the building;

provide, to a user device, the plurality of recommendations;

receive, from the user device, a selection of a first recommendation of the plurality of recommendations; and implement, responsive to receiving the selection of the first recommendation of the plurality of recommendations, control actions included in the first recommendation of the plurality of recommendations.

5. The building management system of claim 1, wherein:

the air quality assessment comprises a prediction of at least one of outdoor air quality or indoor air quality for the building at one or more future times; and the first set of outdoor air quality data comprises data based on measurements from a measurement station of a weather service.

6. The building management system of claim 1, wherein:

the air quality assessment comprises an uncertainty assessment indicating a level of accuracy of the first set of outdoor air quality data or the second set of outdoor air quality data; and the air quality assessment comprises a recommendation to install one or more second local sensors to improve accuracy of the second set of outdoor air quality data.

7. The building management system of claim 1, wherein the air quality assessment comprises an uncertainty map indicating levels of accuracy of the first set of outdoor air quality data for a plurality of different regions, and wherein the instructions further cause the one or more processors to:

generate a customer interest map indicating customer interest in air quality information;

generate a combination of the uncertainty map and the customer interest map;

identify, using the combination of the uncertainty map and the customer interest map, one or more first areas having a customer interest in air quality information where the level of accuracy of the first set of outdoor air quality data is below a certain level; and generate a recommendation to install one or more second local sensors for one or more buildings in the one or more first areas.

8. The building management system of claim 1, wherein the instructions further cause the one or more processors to:

assess how representative one or more locations of the one or more local sensors are of an overall outdoor air quality of the building; and generate, responsive to assessing how representative the one or more locations of the one or more local sensors are of the overall outdoor air quality of the building, a recommendation to install one or more second local sensors.

9. The building management system of claim 1, wherein implementing the one or more control actions comprises generating the one or more control actions automatically using the air quality assessment or receiving at least one input from a user corresponding to the air quality assessment.

10. A method for monitoring or controlling air quality of a building, the method comprising:

obtaining, by one or more processors from a regional air quality data source, a first set of outdoor air quality data, wherein the first set of outdoor air quality data represents air quality measured for a region including the building or proximate to the building;

obtaining, by the one or more processors from one or more local sensors coupled to or positioned proximate to the building, a second set of outdoor air quality data, wherein the second set of outdoor air quality data represents air quality measurements at one or more positions at or near an exterior of the building;

executing by the one or more processors, a model using the first set of outdoor air quality data and the second set of outdoor air quality data as input to generate an air quality assessment for the building based at least on determining a correlation factor between the first set of outdoor air quality data and the second set of outdoor air quality data, wherein executing the model to generate the air quality assessment for the building includes:

executing the model, using at least a portion of the first set of outdoor air quality data and at least a portion of the second set of outdoor air quality data as inputs to the model, to:

determine, based on a comparison of at least the portion of the first set of outdoor air quality data and at least the portion of the second set of outdoor air quality data, a weight metric correlating at least the portion of the first set of outdoor air quality data with at least the portion of the second set of outdoor air quality data; and generate, using the weight metric, a predicted air quality value for the building;

wherein the model is trained using data correlating local air quality data with regional air quality data;

wherein the predicted air quality value for the building is determined relative to outdoor air quality proximate to the building; and controlling, based at least on the air quality assessment, one or more building systems to affect the air quality within the building, by implementing one or more control actions.

11. The method of claim 10, further comprising:

obtaining, by the one or more processors from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model;

obtaining, by the one or more processors from the one or more local sensors, a third set of outdoor air quality data, wherein the third set of outdoor air quality data corresponds to the given first point in time;

determining, by the one or more processors using the first future air quality value of the plurality of future air quality values and the third set of outdoor air quality data, a localized air quality value for the building at the given first point in time; and generating, by the one or more processors using the second future air quality value of the plurality of future air quality values and the third set of outdoor air quality data, a second localized air quality value for the building for the given second point in time, wherein the second localized air quality value for the building is a predicted value.

12. The method of claim 10, wherein the air quality assessment for the building includes a predicted indoor air quality value for the building for a future point in time, and further comprising:

obtaining, by the one or more processors from the regional air quality data source, a predicted outdoor air quality value for the region including the building or proximate to the building, wherein the predicted outdoor air quality value for the region is generated by a regional model and the predicted outdoor air quality value for the region pertains to the future point in time;

obtaining, by the one or more processors from the one or more local sensors, a third set of outdoor air quality data, wherein the third set of outdoor air quality data pertains to outdoor air quality data prior to the future point in time;

updating, by the one or more processors using at least a portion of the third set of outdoor air quality data and the predicted outdoor air quality value for the region, the predicted indoor air quality value for the building for the future point in time; and determining, by the one or more processors using a fourth set of outdoor air quality data, an actual air quality value for the building at the future point in time, wherein the actual air quality value for the building at the future point in time is used to update the regional model that generated the predicted outdoor air quality value for the region.

13. The method of claim 10, wherein the air quality assessment for the building includes an air quality value for the building, and further comprising:

generating, by the one or more processors using the air quality value for the building, a plurality of recommendations, the plurality of recommendations including a plurality of control actions to improve the air quality value for the building;

providing, by the one or more processors to a user device, the plurality of recommendations;

receiving, by the one or more processors from the user device, a selection of a first recommendation of the plurality of recommendations; and implementing, by the one or more processors responsive to receiving the selection of the first recommendation of the plurality of recommendations, control actions included in the first recommendation of the plurality of recommendations.

14. The method of claim 10, wherein:

the air quality assessment comprises an uncertainty assessment indicating a level of accuracy of the first set of outdoor air quality data or the second set of outdoor air quality data; and the air quality assessment comprises a recommendation to install one or more second local sensors to improve accuracy of the second set of outdoor air quality data.

15. The method of claim 10, wherein the air quality assessment comprises an uncertainty map indicating levels of accuracy of the first set of outdoor air quality data for a plurality of different regions, and further comprising:

generating, by the one or more processors, a customer interest map indicating customer interest in air quality information;

generating, by the one or more processors, a combination of the uncertainty map and the customer interest map;

identifying, by the one or more processors using the combination of the uncertainty map and the customer interest map, one or more first areas having a customer interest in air quality information where the level of accuracy of the first set of outdoor air quality data is below a certain level; and generating, by the one or more processors, a recommendation to install one or more second local sensors for one or more buildings in the one or more first areas.

16. The method of claim 10, further comprising:

assessing, by the one or more processors, how representative one or more locations of the one or more local sensors are of an overall outdoor air quality of the building; and generating, by the one or more processors responsive to assessing how representative the one or more locations of the one or more local sensors are of the overall outdoor air quality of the building, a recommendation to install one or more second local sensors.

17. One or more non-transitory storage medium storing instructions thereon that, when executed by one or more processors, cause the one or more processors to implement operations comprising:

obtaining, from a regional air quality data source, a first set of outdoor air quality data, wherein the first set of outdoor air quality data represents air quality measured for a region including a building or proximate to the building;

obtaining, from one or more local sensors coupled to or positioned proximate to the building, a second set of outdoor air quality data, wherein the second set of outdoor air quality data represents air quality measurements at one or more positions at or near an exterior of the building;

executing a model, using the first set of outdoor air quality data and the second set of outdoor air quality data as input to generate an air quality assessment for the building based at least on determining a correlation factor between the first set of outdoor air quality data and the second set of outdoor air quality data, wherein executing the model to generate the air quality assessment for the building includes:

executing the model, using at least a portion of the first set of outdoor air quality data and at least a portion of the second set of outdoor air quality data as inputs to the model, to:

determine, based on a comparison of at least the portion of the first set of outdoor air quality data and at least a portion of the second set of outdoor air quality data, a weight metric correlating at least the portion of the first set of outdoor air quality data with at least the portion of the second set of outdoor air quality data; and generate, using the weight metric, a predicted air quality value for the building; and wherein the model is trained using data correlating local air quality data with regional air quality data;

wherein the predicted air quality value for the building is determined relative to outdoor air quality proximate to the building; and controlling, based at least on the air quality assessment, one or more building systems to affect the air quality within the building, by implementing one or more control actions.

18. The one or more non-transitory storage medium of claim 17, the operations further comprising:

obtaining, from the regional air quality data source, a plurality of future air quality values for the region including the building or proximate to the building, wherein a first future air quality value of the plurality of future air quality values corresponds to a given first point in time and a second future air quality value of the plurality of future air quality values corresponds to a given second point in time, and wherein the plurality of future air quality values are generated by a regional model;

obtaining, from the one or more local sensors, a third set of outdoor air quality data, wherein the third set of outdoor air quality data corresponds to the given first point in time;

determining, using the first future air quality value of the plurality of future air quality values and the third set of outdoor air quality data, a localized air quality value for the building at the given first point in time; and generating, using the second future air quality value of the plurality of future air quality values and the third set of outdoor air quality data, a second localized air quality value for the building for the given second point in time, wherein the second localized air quality value for the building is a predicted value.

19. The one or more non-transitory storage medium of claim 17, wherein the air quality assessment for the building includes a predicted indoor air quality value for the building for a future point in time, and the operations further comprising:

obtaining, from the regional air quality data source, a predicted outdoor air quality value for the region including the building or proximate to the building, wherein the predicted outdoor air quality value for the region is generated by a regional model and the predicted outdoor air quality value for the region pertains to the future point in time;

obtaining, from the one or more local sensors, a third set of outdoor air quality data, wherein the third set of outdoor air quality data pertains to outdoor air quality data prior to the future point in time;

updating, using at least a portion of the third set of outdoor air quality data and the predicted outdoor air quality value for the region, the predicted indoor air quality value for the building for the future point in time; and determining, using a fourth set of outdoor air quality data, an actual air quality value for the building at the future point in time, wherein the actual air quality value for the building at the future point in time is used to update the regional model that generated the predicted outdoor air quality value for the region.

* * * * *